Sept. 22, 1931.   I. J. SNADER   1,824,509
ROTARY TOOL COUPLING

Filed Aug. 30, 1929

INVENTOR,
Ira J. Snader,
BY
ATTORNEY.

Patented Sept. 22, 1931

1,824,509

UNITED STATES PATENT OFFICE

IRA J. SNADER, OF PATERSON, NEW JERSEY

ROTARY TOOL COUPLING

Application filed August 30, 1929. Serial No. 389,563.

In the art of couplings between rotary driving and driven members having a common axis (as a tool and its rotary holder) and of the class in which the assembly is effected first by telescopic movement of one part with respect to the other and then by turning one part on said axis to interlock them against separation by reverse telescopic movement, attended by impact of the parts on such rotation so as to obtain the rotary driving purchase, it has heretofore been the practice to maintain their cooperative engagement with each other by resort to lugs, flat surfaces and other expedients which on account of their form were likely to break off, or to become worn or marred, with consequent jamming of the parts or their failure to cooperate efficiently, and which could not be produced by a simple turning operation, as in a lathe. The object of this invention is to provide a coupling of this class in which the means for maintaining the cooperative engagement with each other of the coupling parts may be largely if not entirely formed by a simple turning operation, whereby said parts may be more expeditiously and inexpensively fashioned, and they will be materially stronger and will be less likely to become marred, distorted, worn or otherwise incapacitated so as not to cooperate efficiently and so as to jam.

In the drawings two forms of the invention are shown, Figs. 1 to 3 showing one and Figs. 4 to 7 the other form.

In Fig. 1 the parts appear assembled, the received part or shank in side elevation and the holder part or socket in central longitudinal section;

Figs. 2 and 3 are sections on lines 2—2 and 3—3, respectively, of Fig. 1;

In Fig. 4 the parts (of the other form) appear as in Fig. 1;

Figure 1:
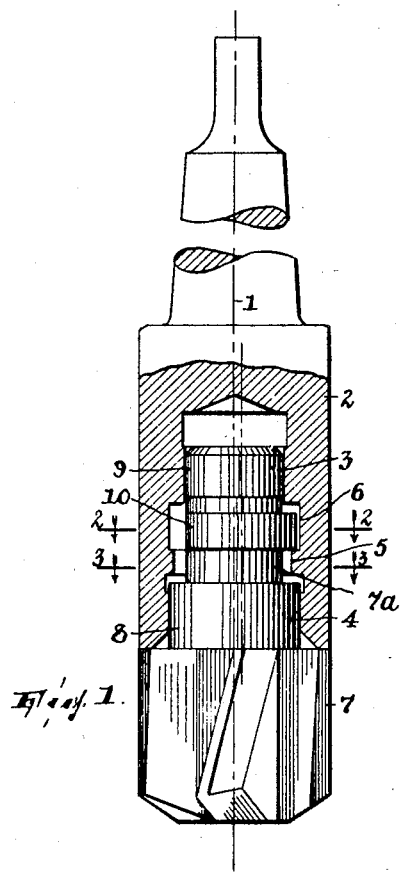

Let 1 designate the axis of rotation of the coupling.

The socket 2 has its bore formed with two cylindrical centering surfaces 3 and 4 concentric with respect to axis 1. In the bore and between these surfaces is a circumferentially extending integral and elongated shoulder 5, here formed circular and eccentric with respect to said axis, inward of which shoulder the bore has an impact surface 6 concentric with the shoulder and therefore also eccentric with respect to said axis. (The term "inward" as herein used means beyond the bore shoulder with respect to the mouth, or here the lower end, of the bore.)

Figure 2:
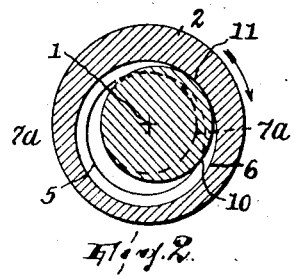

The tool 7 has its shank 7a formed with two cylindrical centering surfaces 9 and 8 concentric with respect to axis 1 and arranged to be respectively received by and fit the centering surfaces of the socket bore. On the shank and between these surfaces is a circumferentially extending integral and elongated shoulder 10, here formed circular and eccentric with respect to said axis. The degree of eccentricity of this shoulder is the same as that of the shoulder 5 of the socket, and its diameter is slightly less than that of said shoulder. Therefore when the shank is turned on axis 1 to the position where shoulder 10 is substantially coaxial with shoulder 5 (or approximately diametrically opposite to its position as shown by Fig. 2) the former may pass through the latter on telescopic movement of the shank with respect to the socket either to assemble or disassemble the coupling.

Further such degree of eccentricity is greater than the degree of spacing of the impact surface 6 radially from the shoulder 5. Therefore when the shank is entered telescopically into the socket so that its shoulder 10 has passed the shoulder 5, on turning the shank its shoulder 10 will impinge against the impact surface 6, thus to obtain the rotary driving engagement of the parts. The point of impact is indicated at 11 in Fig. 2, where the arrow shows the direction of rotation of the socket to drive the tool.

Figure 3:
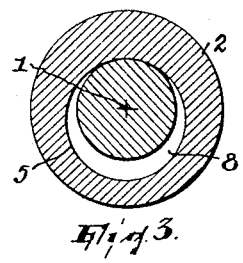
Figures 4, 5:
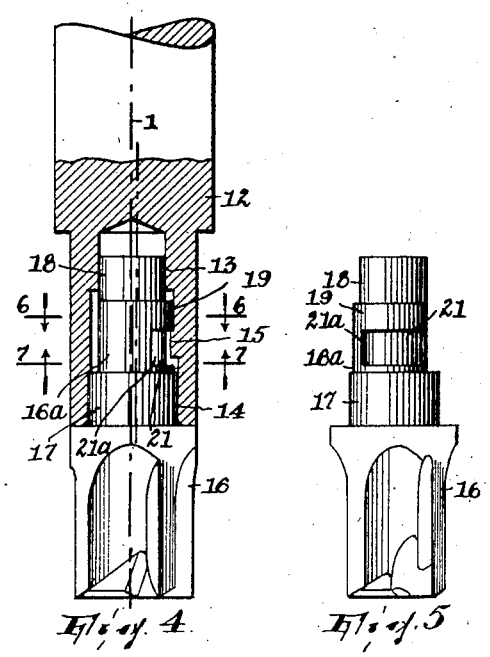
Fig. 5 is a side elevation of the received part or shank shown in Fig. 4.
Figure 6:
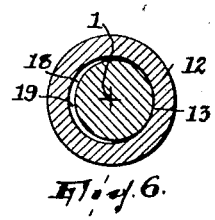
Fig. 6 is a section on line 6—6, Fig. 4, the tool being shown turned in the socket to the position for withdrawal therefrom or the position of Fig. 5.
Figure 7:
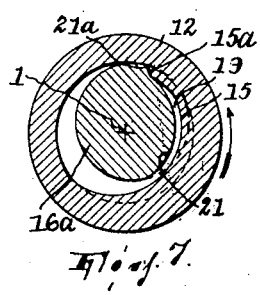
Fig. 7 is a section on line 7—7, Fig. 4, with the tool turned in the socket to the position for driving, being on a larger scale than Figs. 4 to 6.

In Figs. 4 to 7, 12 is the socket, 13 and 14 are the cylindrical centering surfaces in its bore, being concentric with respect to axis 1, and 15 its circumferentially extending integral and elongated shoulder formed between said surfaces and conforming to an arc which cuts across the cylindrical surface of the socket bore; and 16 is the tool whose shank is formed with two cylindrical centering surfaces 18 and 17 concentric with respect to said axis 1 and arranged to be respectively received by and fit the centering surfaces 13 and 14 of the socket, and between which is the eccentric shank portion 16a formed with a circumferentially extending integral and elongated shoulder 19. Therefore, as in Figs. 1 to 3, when the shank is turned on axis 1 to the position where shoulder 19 is out of registry with shoulder 15 (or approximately opposite to its position as shown by Fig. 7) the former may pass through the latter on telescopic movement of the shank with respect to the socket to assemble or disassemble the coupling.

But, when on entering the shank into the socket the former is turned to effect the driving impact, such impact is here obtained by one end of the shoulder 15 being formed as an abutment 15a and the eccentric portion 16a of the shank being formed with a circumferential groove 21 outward of shoulder 19 which affords at one end an abutment 21a. (The term "outward" as herein used means at the side of the shoulder 19 nearer the mouth, or here the lower end, of the bore).

The said abutment surfaces each extend in a chord of the same circle around axis 1 as a center, whereby possible burring thereof by their impact with each other and the possibility of the shank becoming jammed in the socket so as to make difficult its backward rotation for removal are avoided.

In both forms the construction is such that the coupling parts have superior strength and durability over couplings of this class heretofore devised. In the first form, where the coupling would otherwise be weakest and subject to mutilation if not breaking off were its driving impact element a mere lug or flat surface, strength is in fact imparted because the encircling integral shoulder 10 reinforces the shank. In the second form the socket not only is strengthened by the elongated and circumferentially extending integral shoulder 15 but the strength of the shank is greater, because its abutment 21a is formed in a groove in an eccentric portion thereof, than it would be if it were formed as a projection on the plain shank.

I claim:

1. A rotary coupling between rotary driving and driven members comprising a socket having a bore formed with a cylindrical centering surface concentric with the axis of rotation of the coupling and a shank revoluble around said axis in and having a cylindrical centering surface to snugly fit said surface of the bore, said socket having a circular shoulder eccentric with respect to said axis and an impact surface, and the shank having a circular shoulder eccentric with respect to said axis in substantially the same degree as the first shoulder and of less diameter than the latter and also having an impact surface to impinge the first impact surface on relative rotation of the socket and shank, whereby on entering the shank into the socket bore when the shank and bore are axially alined and the former is first rotated so that said shoulders are coaxial the shank shoulder may pass the bore shoulder and on then turning the shank in the bore the shank impact surface will impinge against the bore impact surface.

2. In combination, a socket member having a bore formed with a cylindrical centering portion and portions eccentric to said centering portion and offset each with respect to the other, and a tool shank having a cylindrical centering portion that detachably and rotatably engages in the centering portion of the socket, said shank portion having an eccentric portion that passes through one of the eccentric portions of the bore when in one position and into the other eccentric portion and when rotated out of line with the first eccentric portion is held against detachment, said shank when so rotated, having a bearing against the wall of the bore.

3. In combination, a socket member having a bore provided with an outer axial centering portion, a first portion behind the axial portion that is eccentric thereto, and a second eccentric portion behind the first eccentric portion and offset with respect thereto, said eccentric portions forming an annular internal rib behind the axial centering portion, and a tool shank having an axial centering portion slidably detachable and rotatable in the centering portion of the bore, and having an eccentric portion that passes through the outer of the eccentric portions of the bore and when rotated engages behind the rib, said shank having a portion that abuts against the wall of the socket when so rotated.

In testimony whereof I affix my signature.

IRA J. SNADER.